Nov. 7, 1967 — C. E. HOOK ET AL — 3,351,262

EGG CARTON

Filed June 1, 1965 — 4 Sheets-Sheet 1

INVENTORS
C.E. HOOK
D.G. COLEMAN
BY Roy A. Plant
ATTORNEY

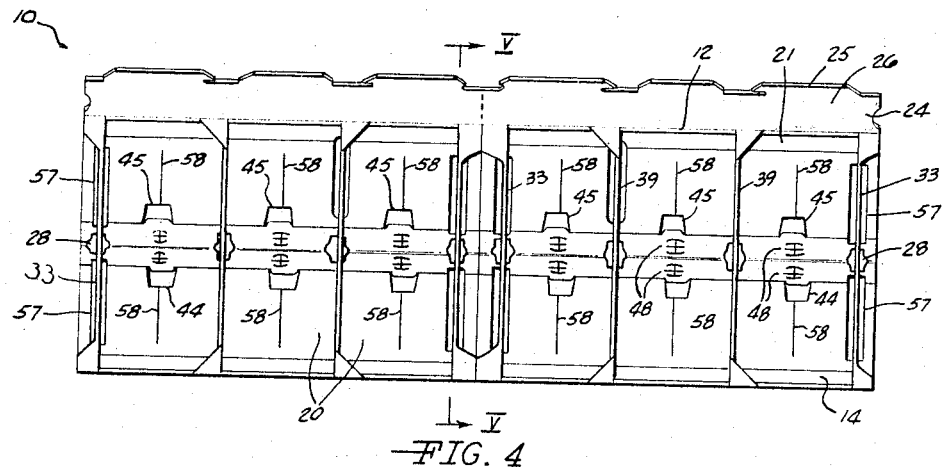
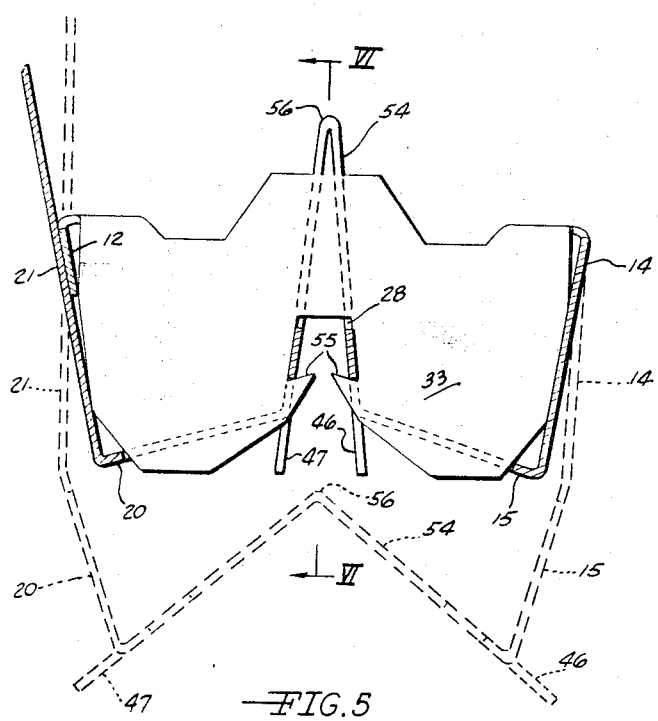
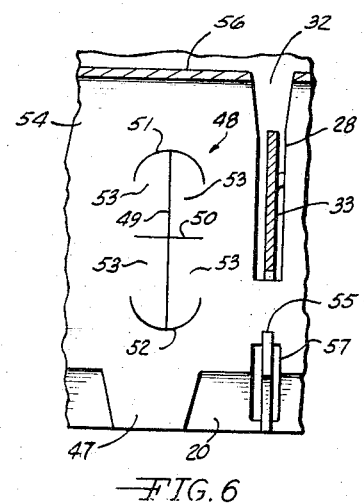

INVENTORS
C. E. HOOK
D. G. COLEMAN

BY Roy A. Plant
ATTORNEY

United States Patent Office 3,351,262
Patented Nov. 7, 1967

3,351,262
EGG CARTON
Charles E. Hook and Donald G. Coleman, Battle Creek, Mich., assignors to Michigan Carton Co., Battle Creek, Mich., a corporation of Michigan
Filed June 1, 1965, Ser. No. 460,378
12 Claims. (Cl. 229—29)

This invention relates in general to new and useful improvements in containers, and more particularly to an improved egg carton.

Eggs are commonly packed in dozen size egg cartons and then stacked, sometimes all in the same direction, in wire crates or baskets with these egg cartons, filled with eggs, stacked five cartons high. It thus will be apparent that if the egg crate or wire basket is dropped in the course of handling, this puts a terrific pressure on the bottom egg carton due to the weight of the four cartons of eggs resting on it. To aggravate this the egg cartons are universally narrower at their bottom than at their top with the bottom side edges of the carton resting inward of the side edges of the top panel of a next lower egg carton when stacked in the same direction, which, with a low center ridge or inadequately supporting ridge for the carton cover, allows the cover to depress when the wire basket with egg cartons is dropped with resultant breaking of eggs to commonly occur and especially in connection with those eggs which are a little longer than usual. Another problem of the egg carton art has involved the unhooking of the end partitions of the egg carton when exposed to relatively heavy strains such as are encountered when an egg filled carton is roughly picked up by one end, as will be hereinafter explained, or the wire crate given an end blow in shipment or handling. A further difficulty which has led to egg breakage has been due to the old style cathedral cutting of the egg carton ridge to cushion the side of the egg, since the carton board is hard and stiff and does not relax to properly cushion the eggs, even partially, until they have been in the egg carton for several hours. It was a recognition of these problems, as well as others, and the need of an improved, commercially acceptable, egg carton less subject to use difficulties as well as breakage of eggs under the conditions noted which led to the conception and development of the present invention.

Accordingly, among the objects of the present invention is the provision of an egg carton utilizing carton board in its manufacture, said egg carton being of a form which reduces egg breakage to a minimum by providing support for the egg carton lid, as well as by reducing danger of unhooking of the end partitions and spilling of eggs as a result, and also by providing improved cushioning of eggs in contact with the inverted V-shape center ridge of the egg carton.

Another object of the present invention is the provision of an egg carton having a high center, inverted V-shape ridge with a cathedral in each side of same for each egg receiving cell, each said cathedral being cross slit and having a deeply upturned lower end and a deeply downturned upper end at opposite sides of same with said center ridge also being vertically slit substantially centrally of each egg receiving cell approximately from the center of said downturned to the center of said upturned end portions.

Another object of the present invention is to provide an egg carton of the inverted V-shape ridge type with a substantially like size cathedral in each side of same for each egg receiving cell thereof, each said cathedral being substantially centered lengthwise of each egg cell and having a deeply downturned upper end and a deeply upturned lower end with said center ridge being vertically slit from said downturned to said upturned end portions, said cathedrals of said central V-shaped ridge in egg cells opposite each other being moderately offset so that one is slightly higher positioned than the other.

Another object of the present invention is to provide the bottom of said inverted V-shape ridge with supporting legs opposite to each other for each pair of oppositely positioned egg receiving cells with each said pair of opposite supporting legs being moderately offset from each other lengthwise of said carton.

A further object is to provide an egg carton having a pair of deep end cross partition walls with a pair of shallow cross partition walls between same, said deep cross partition walls having inwardly extending carton ridge engaging hooks with each said hook engaging a suitably positioned opening in the side of an inverted V-shape ridge to hold said deep cross partition against upward movement relative to said ridge, the inner end portions of said inwardly extending hooks having their upper edge angling moderately upward as they approach each other to further resist accidental unhooking of same from the corresponding opening of said ridge.

Still further objects and advantages of this invention will appear as the description proceeds.

To the accomplishment of the foregoing and related ends, the invention, then, consists of the carton means hereinafter fully described and particularly pointed out in the claims, the annexed drawings and the following description setting forth in detail certain illustrative embodiments of the egg carton of the present invention, such disclosed embodiments illustrating, however, but one of the various ways in which the principle of the invention may be used.

In the annexed drawings:

FIGURE 3 is an end view of the egg carton blank in prefolded and glued form as seen along line III—III of FIGURE 1, looking in the direction of the arrows.

FIGURE 4 is a top view of the set-up egg carton shown in FIGURE 2.

FIGURE 5 is an enlarged sectional view of the egg carton of the present invention as taken along line V—V of FIGURE 4, looking in the direction of the arrows, and with the phantom lines showing the bottom and ridge in one position as same moves up to the engaged position shown in solid lines.

FIGURE 6 is a view taken along line VI—VI of FIGURE 5, looking in the direction of the arrows.

Figure 1:
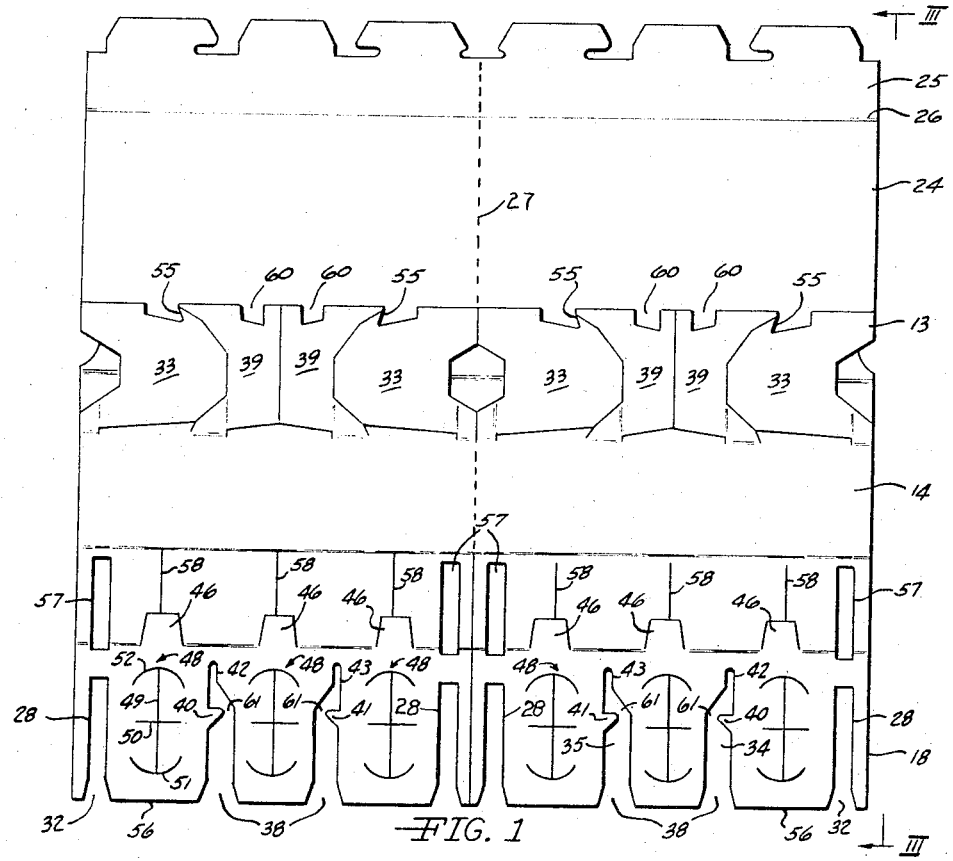
FIGURE 1 shows a blank for producing the egg carton of the present invention, such blank being prefolded and glued ready for setting up in finished egg carton form ready for filling with eggs.
Figure 2:
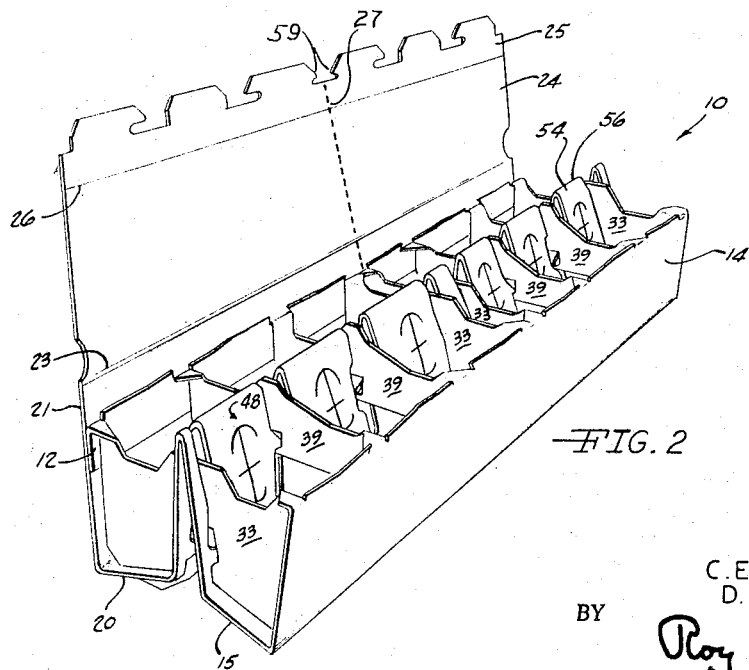
FIGURE 2 shows in perspective the improved egg carton of the present invention in set-up form ready for filling with eggs.
Figure 7:
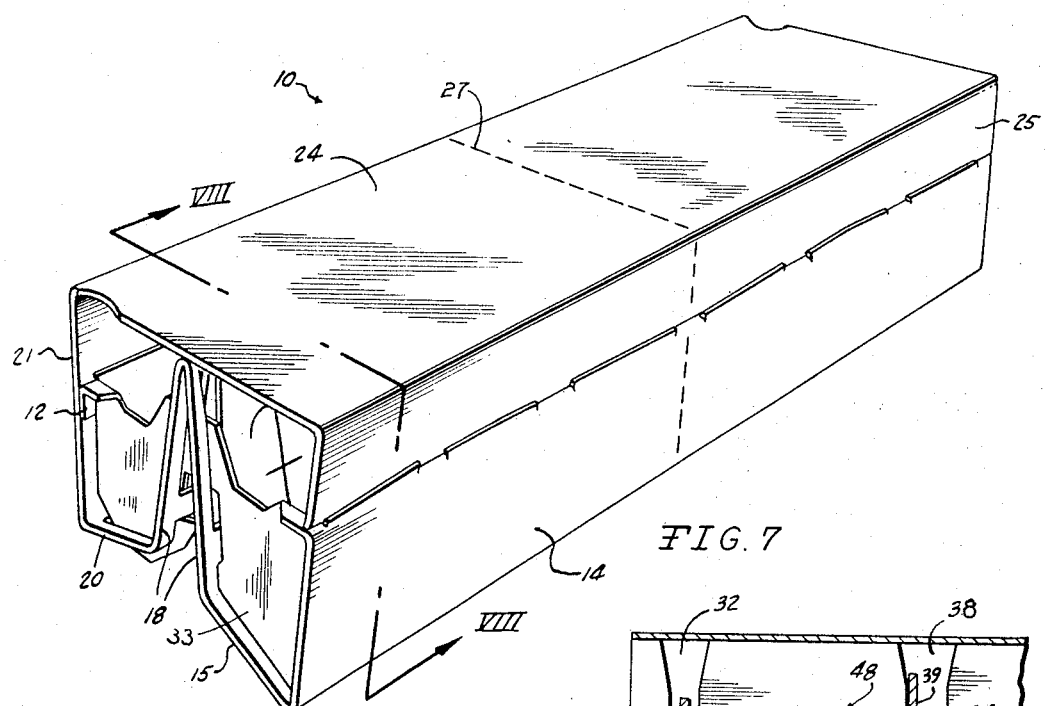
FIGURE 7 is an enlarged perspective view of the egg carton of the present invention in set-up form and with the cover closed and hooked in conventional manner.
Figure 10:
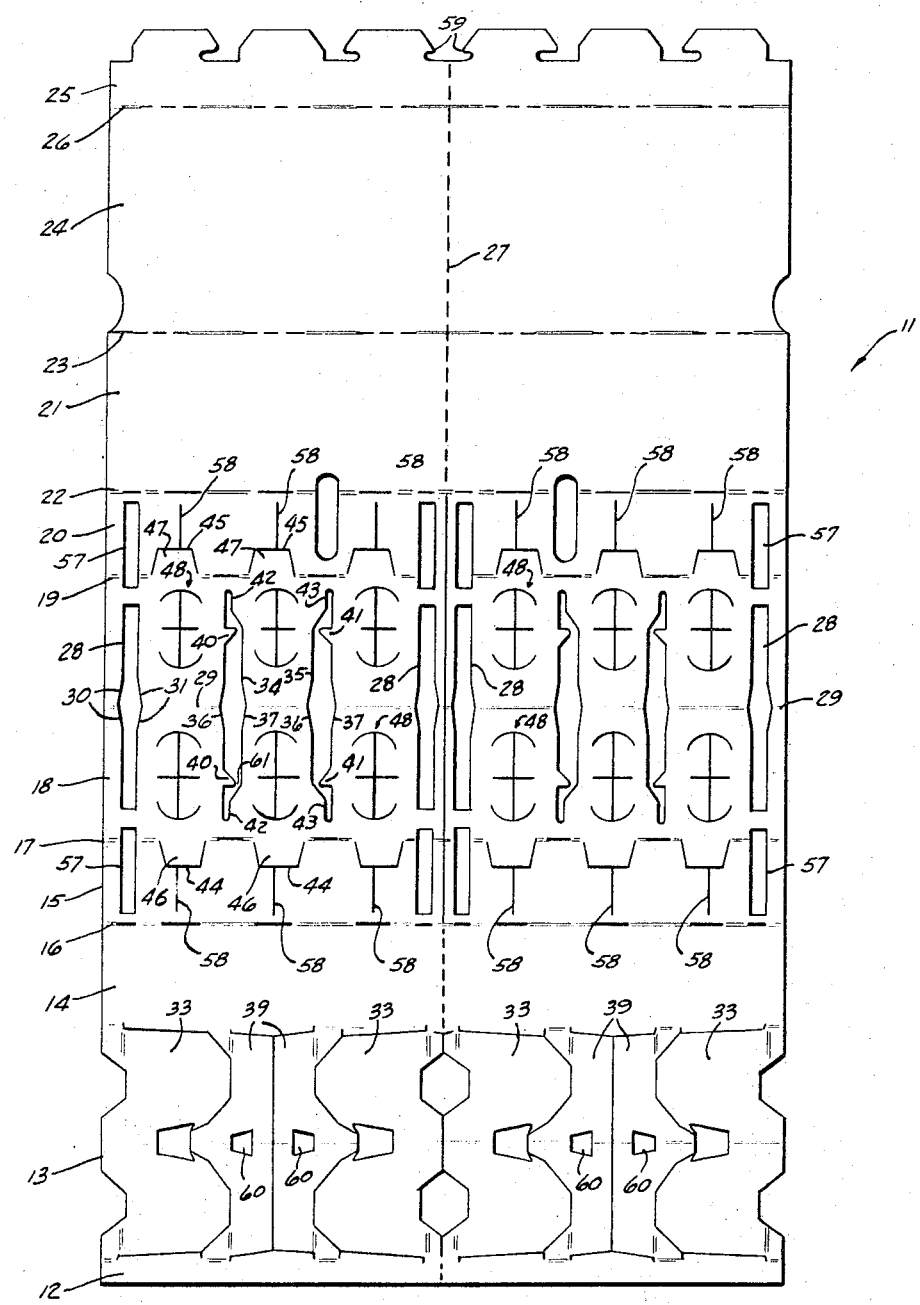
FIGURE 10 is a view showing the blank of the egg carton of the present invention before folding and gluing as shown in FIGURES 1 and 3.

Referring more particularly to the drawings in detail where the egg carton, which is the subject of this invention, is generally referred to by the numeral 10, wherein the overall appearance of same when set up is shown in FIGURES 2 and 7, it will be noted that this egg carton is formed from a generally rectangular blank 11, FIGURE 10, which is prefolded and glued as shown in FIGURES 1 and 3 ready for being set up as illustrated.

The blank 11 is divided into a plurality of areas by transverse fold lines and cut lines. Starting with the bottom of blank 11, as viewed in FIGURE 10, there is a narrow attaching flange 12 and then a transverse partition forming area 13 which is followed by a partial upstanding wall member 14. This wall member 14 is separated from an adjacent bottom member 15 by a combined fold and cut line 16. A combined fold and cut line 17 separates the bottom member 15 from an adjacent longitudinal partition forming area 18 which, in turn, is separated from a bottom member 20 by a combined fold and cut line 19. A full upstanding wall member 21 is disposed next to the bottom member 20 and is separated therefrom by a combined fold and cut line 22, and has an opposite edge thereof defined by a fold line 23. A cover panel 24 is disposed next to the wall member 21 and is separated from a hook carrying partial wall member 25 and attached thereto along a fold line 26.

Referring again to FIGURE 10, it will be noted that blank 11 is generally symmetrical about a longitudinal centerline 27, which is partially perforated and partially cut, and the ridge area 18 has elongated substantially rectangular cut-outs 28 at each of same as well as along opposite sides of longitudinal centerline 27. The purpose of the partially perforated and partially cut centerline 27 is to permit the egg filled carton at the retail store to be broken along this centerline to provide half dozen cartons. The central portion of these cut-outs 28, at ridge fold line 29, are preferably provided with outward flaring portions 30 and 31 which provide an enlarged inlet 32, FIGURE 9, into the upper end of cut-out 28 when the egg carton is in set-up form. This enlarged inlet 32 facilitates receiving the bottom edge of the deep cross partition 33 in the course of setting up the egg carton, for instance as set forth in U.S. Patent No. 3,141,391.

Figure 9:
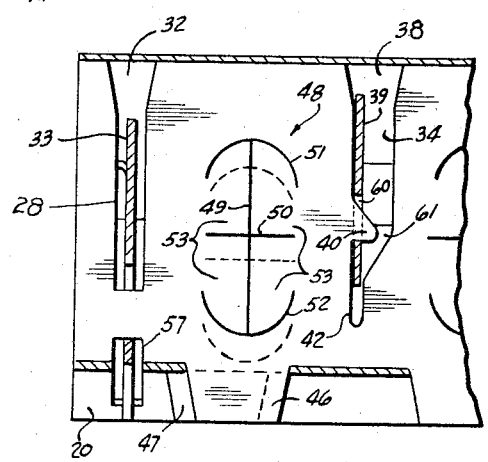
FIGURE 9 is a sectional view as taken along line IX—IX of FIGURE 8, looking in the direction of the arrows.

Parallel to elongated slots 28, FIGURE 10, and between each pair of same, are a pair of symmetrically spaced elongated slots 34 and 35, the central portion of each of which has an outward flaring portion 36 and 37 which forms an enlarged inlet 38, FIGURE 9, into the upper end of elongated slots or cut-outs 34 and 35 when the egg carton is in set-up form. These elongated slots or cut-outs 34 and 35 are preferably a little wider in the ridge fold line 29 area as is shown in FIGURES 1, 9 and 10 to facilitate receiving the shallow unbroken bottom cross partitions 39 in the course of setting up the egg carton as described above in connection with slot 28.

Elongated slots 34 and 35 are, respectively, provided with hooks 40 and 41 with the side of said slots 34 and 35 at the base of said hooks extending below said hooks substantially perpendicular to the bottom edge of the upstanding wall members 14 and 21. The other side of each of said elongated slots 34 and 35, substantially opposite the point of each of said hooks 40 and 41, starts tapering toward the hook carrying side of said slots, FIGURES 1, 9 and 10, and then straightens out so as to be substantially parallel to the hook carrying side of said elongated slots to form terminal pockets 42 and 43 to engage the bottom of the shallow cross partitions 39 and hold them upright as shown in FIGURE 9, while leaving an open throat 61 to receive shallow cross partitions 39. Hooks 40 and 41, as shown in FIGURES 1 and 10, are preferably oppositely directed, and an exceptionally satisfactory way of doing this is to direct the points of said hooks 40 and 41 toward each other.

Where extra large or jumbo size eggs are to be packed, the egg cartons have to be larger so that each egg cell of the egg carton can receive and hold an egg with a minimum of egg breakage from the time they are packed until the time the ultimate consumer uses them. One thing which helps to solve this situation is to provide the bottom of the carton, FIGURE 10, adjacent the two sides of the inverted V-shaped ridge, with cuts 44 in one side and with cuts 45 in the other to provide, when the carton is set up, FIGURES 5 and 8, with supporting feet 46 and 47, respectively, extending from the adjacent bottom edges and in the plane of the two sides of the inverted V-shaped ridge center partition 54. In addition, we have found that when the supporting feet 46 and 47 are directly opposite to each other there is a tendency for these feet to catch on each other when the carton blanks are stacked and being fed through the egg carton set up machine so that more than one is fed at the same time with the egg carton set up machine being only able to handle one blank at a time. One phase of the present invention is to overcome or minimize this difficulty of multiple carton feeding and this we have found is largely accomplished by offsetting sidewise feet 46 from feet 47, for instance one-sixteenth of an inch to three-sixteenths of an inch, as illustrated in FIGURES 9 and 10.

Another difficulty which has been encountered, particularly in the packaging of extra large or jumbo size eggs, has been that the cardboard stock used in making these cartons must be of high quality in order for the carton to hold its shape and maintain adequate strength to protect the eggs when sold, particularly when the filled cartons have been in cold storage for a period of time. High quality stock meeting these requirements is relatively hard and stiff so that the conventional plain cathedral cross slitting of the side panels of the ridge, substantially in the center of each egg receiving cell, provides stiff, relatively rigid, wide hinged, tongue shaped members which firmly resist letting the egg settle into this cathedral cut area for cushioning purposes and thus force the opposite side of the egg firmly against the rigid, uncut, side wall 14 or 21 of the carton. This increases the danger of egg breakage in the handling and transporting of the packaged eggs, and particularly when the eggs are just packed. To reduce this egg breakage hazard, with egg cartons having the conventional cathedral construction, it is necessary to hold the freshly packaged eggs in storage until fatigue of the carton stock in the area of this type of cathedral cutting allows the tongues of same to become fatigued and relax to let the eggs settle into the cathedral and be properly cushioned and supported therein.

We have found that by making the cathedral of special shape, as shown in the various figures of the drawings, for instance, FIGURES 6 and 9, this problem is substantially completely overcome. Referring to FIGURE 9, the cathedral 48 is substantially centered in the egg receiving cell between the cross partitions, for instance the cross partitions 33 and 39 shown in this particular figure. This cathedral 48 has a longitudinal slit 49 substantially parallel to the sides of cross partitions 33 and 39 in the set-up carton. Substantially midlength of slit 49 same is provided with a shorter cross slit 50. The upper end of longitudinal slit 49 is provided with a deeply downturned end slit 51 which, in preferred form is substantially arcuate. The lower end of longitudinal slit 49 is provided with a deeply upturned end slit 52 which, in preferred form is substantially arcuate. Making the cathedral 48 in this manner provides four ears 53 which have relatively short hinge lines extending from the ends of cross slit 50 to the respective ends of the adjacent downturned and upturned end slits 51 and 52 of the cathedral, FIGURES 6 and 9. These short hinge lines allow the ears 53 of the cathedral to immediately bend back and cushion the egg in the egg cell, when placed therein, without waiting for fatigue to set in to permit cushioning the egg in accordance with past practice.

A preferred range of sizes of the cathedrals is from seven-sixteenths of an inch to nine-sixteenths of an inch width of the downturned end slit 51 and five-sixteenths of an inch to nine-sixteenths of an inch width of the upturned end slit 52, with the preferred size being a half-inch width for the downturned end slit 51 and seven-sixteenths of an inch width for the upturned end slit 52, and wherein said slits 51 and 52 are preferably arcuate and symmetrical with the ends of longitudinal slit 49 which in turn is preferably approximately one and one-half inch long with the ends of cross slit 50 being approximately intermediate the ends of said slits 51 and 52. This shape and size of the cathedrals forms a very satisfactory contact line with the side of the egg when the ears 53 are bent back in nesting and supporting the egg in the corresponding egg receiving cell of the egg carton 10. The space in between the cathedral carrying sides of the inverted V-shaped partition is made sufficient to permit free cushioning of the eggs by the cathedrals. Cathedrals of this type are far superior to any other type previously proposed or used in the egg carton art in minimizing egg breakage in transportation and handling between the egg packager and the ultimate consumer. The feet 46 and 47, which also aid in stabilizing the carton, are preferably about the same width as these cathedrals.

A thing which has been encountered in connection with setting up of egg cartons ready for filling has been that there is a tendency for the cathedral of one prefolded and glued blank to catch on the cathedral of the adjacent like egg carton blank and interfere with the proper feeding of same, one at a time, through the egg carton set up machine. We have found that this situation is greatly improved if the cathedrals on opposite panels of the inverted V-ridge are vertically shifted relative to each other, FIGURE 9, for instance approximately three-sixteenths of an inch. In other words by shifting one cathedral up three thirty-secondths of an inch and the other cathedral down three thirty-secondths of an inch from their ideal positions this will not interfere with their functioning efficiently while reducing the tendency for the cathedrals to catch on each other during the feeding of the empty prefolded and glued carton blanks through the egg carton set up machine when stacked in the supply hopper in position for feeding one at a time.

When egg-filled egg cartons are stored in a storage room or refrigerated display counter which is even mildly damp, the carton stock absorbs moisture and moderately softens so that it is not as strong or rigid as when originally manufactured. The eggs in the end cells of such egg carton exert sidewise pressure on the deep end cross partitions 33, FIGURE 7, which commonly have straight top hooks parallel to closed cover 24, and which engage suitable holes 57 in the inverted V-shaped center partition 54, with the top edge of each pair of such hooks being in alinement with each other. Under these conditions if the egg carton is picked up by one end, for instance from the refrigerated case in the retail grocery store, with a hurried rapid motion or jerk, as is sometimes the prevailing situation, this has sometimes caused the hooks on the end partition to disengage and allow the end eggs to escape and break. Tests have shown that this difficulty can be largely overcome by having the hooks 55, FIGURES 5 and 8, of the deep cross partitions 33 turn moderately upward at their outer ends to hook in holes 57 as shown, and this construction, which firmly resists unhooking, is one phase of our invention.

Figure 8:
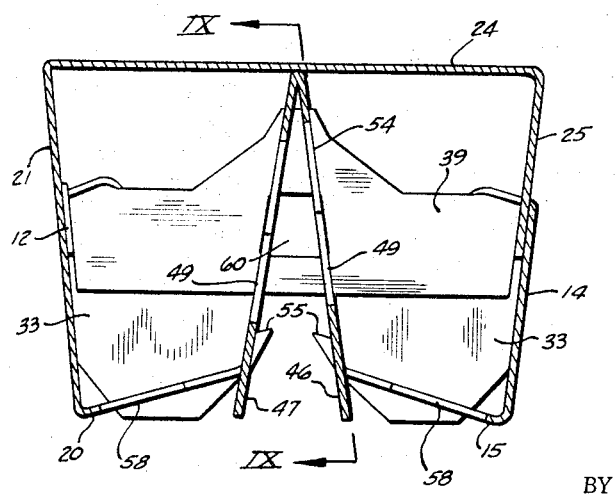
FIGURE 8 is a sectional view as taken along line VIII—VIII of FIGURE 7, looking in the direction of the arrows.

To give the egg carton added strength to support and protect extra large and jumbo eggs we prefer to use an egg carton which is so constructed that the top 56, at the ridge fold line 29, of the inverted V-shaped center partition 54, FIGURE 5, will support the cover panel 24 of the egg carton 10 as shown, for instance, in FIGURES 7 and 8. This gives great stacking strength and aids in protecting the packaged eggs from excessive end breakage and is a commonly followed procedure in the egg carton manufacturing art.

The bottom 20 of the egg carton 10, FIGURE 4, at the central portion of each egg receiving cell, is provided with a bottom slit 58 which extends toward the carton side panels 14 or 21, respectively, from cuts 44 and 45, respectively. This slitting of the carton bottom substantially centrally of each egg receiving cell is for the purpose of providing some resilient cradling of the lower end of the egg resting in such cell to thus further minimize egg breakage in storage as well as in the handling of the filled egg cartons.

The shallow cross partitions 39 have an unbroken bottom, as shown, and are provided above said bottom with a suitable hole or perforation 60, FIGURES 8 and 10, which is adapted to engage hooks 40 or 41 in slots 34 or 35, respectively, for anchoring the shallow cross partitions 39 in place in the set up carton, as specifically illustrated in FIGURES 2 and 9. This provides a very strong and stable egg carton far superior to the old-fashioned egg cartons previously used. To further stiffen the closed egg carton and resist wracking under conditions of handling, the hook carrying edge of partial wall member 25 may be provided with a pair of small center hooks 59, FIGURES 1 and 10, which in the set up and filled egg carton hook under the hinged portion of the side edges of the center pair deep cross partitions to substantially prevent movement of the top portion of the egg carton relative to the bottom portion.

It will thus be readily apparent that novel and advantageous provision has been made for carrying out the desired ends hereinbefore set forth. However, attention is directed to the fact that variations may be made in the egg carton constructions disclosed herein without departing from the spirit and scope of the invention as above described and illustrated in the drawings. Also directional terms such as "upper," "lower," "front," "back," et cetera, have been used to facilitate explaining the invention in the positions of the egg carton and blank as shown in the drawings and are not to be considered as limiting the invention.

Other modes of applying the principle of our invention may be employed instead of the one explained, change being made as regards the carton and details herein disclosed, provided the features stated in any of the following claims or the equivalent of such stated features be employed.

We therefore particularly point out and distinctly claim as our invention:

1. An egg carton having spaced wall members, bottom members, an inverted V-shaped ridge center partition open from the bottom to the top thereof and forming a longitudinal partition connecting together said bottom members with the bottom of said carton being elevated in its longitudinal partition edge joining portion, transverse partitions cooperating with said longitudinal partition to separate the interior of the egg carton into a multiplicity of egg receiving pockets, and a cover member normally closing said egg carton, which includes an egg cushioning cathedral for each of said egg receiving pockets, said cathedral being wholly located in said ridge side of said pocket and substantially centered lengthwise of same, said cathedral having a substantially central vertical slit of a length approximately equal to one-half to three-fourths the depth of the ridge side of said pocket and generally vertically centered on same, the upper end of said vertical slit having substantially centered thereon a deeply downturned cross slit while the lower end of said vertical slit has substantially centered thereon a deeply upturned cross slit, and a cross slit substantially midlength of said vertical slit, the ends of said cross slit being approximately centered between the corresponding ends of said deeply downturned and deeply upturned cross slits, and wherein said cathedrals in said egg receiving pockets on opposite sides of said longitudinal inverted V-shaped ridge center partition are offset approximately one-sixteenth to three-sixteenths of an inch from each other.

2. An egg carton as set forth in claim 1, wherein said cathedrals are approximately a half inch wide, said offsetting is in a vertical direction, and said deeply downturned and deeply upturned cross slits are substantially arcuate.

3. An egg carton having spaced wall members, bottom members, an inverted V-shaped ridge center partition open from the bottom to the top thereof and forming a longitudinal partition connecting together said bottom members with the bottom of said carton being elevated in its longitudinal partition edge joining portion, transverse partitions cooperating with said longitudinal partition to separate the interior of the egg carton into a multiplicity of egg receiving pockets, and a cover member normally closing said egg carton, which includes an egg cushioning cathedral for each of said egg receiving pockets, said cathedral being wholly located in said ridge side of said pocket and substantially centered lengthwise of same, said cathedral having a substantially central vertical slit of a length approximately equal to one-half to three-fourths the depth of the ridge side of said pocket and generally vertically centered on same, the upper end of said vertical slit having substantially centered thereon a deeply downturned cross slit while the lower end of said vertical slit has substantially centered thereon a deeply upturned cross slit, and a cross slit substantially midlength of said vertical slit, the ends of said cross slit being approximately centered between the corresponding ends of said deeply downturned and deeply upturned cross slits, and wherein said egg carton also has supporting feet, one for each egg receiving pocket, said supporting feet being below each said cathedral and in the plane of same, and forming extensions of the sides of said inverted V-shaped ridge center partition with each such extension being approximately as wide as said cathedral and terminating substantially in a plane including the junction of said wall members and bottom members, and further, wherein said supporting feet on opposite sides of said inverted V-shaped ridge center partition are offset sidewise from each other approximately in the range of one-sixteenth to three-sixteenths of an inch.

4. An egg carton having spaced wall members, bottom members, an inverted V-shaped ridge center partition open from the bottom to the top thereof and forming a longitudinal partition connecting together said bottom members with the bottom of said carton being elevated in its longitudinal partition edge joining portion, transverse partitions cooperating with said longitudinal partition to separate the interior of the egg carton into a multiplicity of egg receiving pockets, and a cover member normally closing said egg carton, said cover member being in the form of a cover panel and a hook carrying partial wall member mounted on a side edge of said cover panel with part of said hooks being in the form of a pair of small center hooks for closely engaging a pair of said transverse partitions to stabilize the carton, wherein said transverse partitions which are at the opposite ends of said egg carton extend substantially to the plane of the bottom of said egg carton and have an upwardly extending deep notch in the bottom center portion of same, said inverted V-shaped ridge center partition having a notch in its top to receive and fit the deep notched bottom portion of said transverse partition, said bottom panels of said carton and the lower portion of the adjacent side of said inverted V-shaped ridge center partion being slotted to permit the bottom portion of said transverse partition to extend therethrough, an inwardly and upwardly extending outer end alined pair of hooks in the opposite sides of said deep notch of said transverse partitions which extend substantially to the bottom of said carton, said hooks engaging the end of said carton bottom slot which terminates in the lower portion of said inverted V-shaped ridge center partition, to hold said transverse end partitions firmly in place, said egg carton also including an egg cushioning cathedral for each of said egg receiving pockets, said cathedral being wholly located in said ridge center partition side of said pocket and substantially centered lengthwise of same, said cathedral having a substantially central vertical slit of a length approximately equal to one-half to three-fourths the depth of the ridge center partition side of said pocket and generally vertically centered on same, the upper end of said vertical slit having substantially centered thereon a deeply downturned cross slit while the lower end of said vertical slit has substantially centered thereon a deeply upturned cross slit, and a cross slit substantially midlength of said vertical slit, the ends of said cross slit being approximately centered between the corresponding ends of said deeply downturned and deeply upturned cross slits.

5. An egg carton as set forth in claim 4, wherein said deeply downturned and deeply upturned cross slits are substantially arcuate.

6. An egg carton as set forth in claim 4, wherein the vertical length of said cathedral is approximately two-thirds the depth of the ridge center partition side of said pocket and said deeply downturned and deeply upturned cross slits are substantially arcuate.

7. An egg carton as set forth in claim 4, wherein said egg carton has supporting feet, one for each egg receiving pocket, said supporting feet being cut from said carton bottom members and extending below each said cathedral and in the plane of same and forming extensions of the sides of said inverted V-shaped ridge center partition with each such extension being approximately as wide as said cathedral and terminating substantially in a plane including the junction of said wall members and bottom members, and slits in said bottom members extending toward the carton wall members from the bottom of said supporting feet cut out portions and substantially centered lengthwise of said egg receiving pockets to provide some resilient cradling of eggs carried by same.

8. A paperboard type egg carton of machine set-up form comprising spaced wall members, bottom members, an inverted V-shaped ridge center partition open from the bottom to the top thereof and forming a longitudinal partition connecting together said bottom members with the bottom of said carton being elevated in its central portion and narrower than the top of said carton, transverse partitions cooperating with said longitudinal partition to separate the interior of said carton into a multiplicity of egg receiving pockets, and a cover member normally resting on the top of said V-shaped ridge center partition and closing the top of said egg carton after same has been filled with eggs which include a partial wall member along one edge of said cover member, said partial wall member having hooks on the edge of same for engaging and interlocking with the ends of said transverse partitions at the point of their joinder to said adjacent wall member, four of said hook members being in pairs facing each other and spaced apart by a tongue member and a central pair of shorter hooks facing each other and closely spaced to engage the ends of the adjacent pair of center transverse partitions of the egg carton and substantially stabilize said cover member in fixed position relative to the carton wall below and adjacent said hooks, said transverse partitions at the opposite ends of said egg carton extend substantially to the plane of the bottom of said egg carton and have an upwardly extending deep notch in the bottom center portion of same, said inverted V-shaped ridge center partition having a notch in its top to receive and fit the deep notched bottom portion of said transverse partition, said bottom panels of said carton and the lower portion of said V-shaped ridge center partition adjacent thereto being slotted to permit the bottom portion of said transverse partition to extend therethrough, an inwardly and upwardly extending alined pair of hooks in opposite sides of said deep notch of said transverse partitions which extend substantially to the bottom of said carton, said hooks engaging the end of said carton bottom slot which terminates in the lower portion of said V-shaped ridge center partition, to hold said transverse end partitions firmly in place, said egg carton also including an egg cushioning cathedral for each of said egg receiving pockets, said cathedral being wholly located in said ridge center partition side of said pocket and substantially centered lengthwise of same, said cathedral having a substantially central vertical slit of a length approximately equal to two-thirds the depth of the ridge center partition side of said pocket and generally vertically centered on same, the upper end of said vertical slit having substantially centered thereon and connected thereto a deeply downturned and substantially arcuate cross slit while the lower end of said vertical slit has substantially centered thereon and connected thereto a deeply upturned and substantially arcuate cross slit, and a cross slit substantially midlength of said vertical slit, the ends of said cross slit being approximately centered between the corresponding ends of said deeply downturned and deeply upturned cross slits to form relatively short hinge lines for the flaps formed by said cross slits thus permitting immediate cushioning of eggs placed in said pockets, said inverted V-shaped ridge center partition being sufficiently open at its bottom to facilitate said egg cushioning by said cathedrals while providing adequate clearance between the backs of said cathedrals for free cushioning of said eggs in said egg receiving pockets on opposite sides of said ridge.

9. An egg carton as set forth in claim 8, wherein said egg carton also has supporting feet, one for each egg receiving pocket, said supporting feet being below each said cathedral and in the plane of same, and forming extensions of the sides of said inverted V-shaped ridge center partition with each such extension being approximately as wide as said cathedral and terminating substantially in a plane including the junction of said wall members and bottom members.

10. An egg carton as set forth in claim 9, wherein said supporting feet on opposite sides of said inverted V-shaped ridge center partition are offset sidewise from each other approximately in the range of one-sixteenth to three-sixteenths of an inch, and said cathedrals on the opposite sides of said V-shaped ridge center partition are vertically offset from each other approximately one-sixteenth to three-sixteenths of an inch.

11. An egg carton having spaced wall members, bottom members, an inverted V-shaped ridge center partitions open from the bottom to the top thereof and forming a longitudinal partition connecting together said bottom members with the bottom of said carton being elevated in its longitudinal partition edge joining portion, transverse partitions cooperating with said longitudinal partition to separate the interior of the egg carton into a multiplicity of egg receiving pockets, and a cover member normally closing said egg carton, wherein said transverse partitions which are at the opposite ends of said egg carton extend substantially to the plane of the bottom of said carton and have an upwardly extending deep notch in the bottom center portion of same, said inverted V-shaped ridge center partition having a notch in its stop to receive and fit the deep notched bottom portion of said transverse partition, said bottom panels of said carton and the lower portion of the adjacent side of said inverter V-shaped ridge center partition being slotted to permit the bottom portion of said transverse partition to extend therethrough, an inwardly and upwardly extending outer end alined pair of hooks in the opposite sides of said deep notch of said transverse partitions which extend substantially to the bottom of said carton, said hooks engaging the end of said carton bottom slot which terminates in the lower portion of said inverted V-shaped ridge center partition, to hold said transverse end partitions firmly in place, said egg carton also including an egg cushioning cathedral for each of said egg receiving pockets, said cathedral being wholly located in said ridge center partition side of said pocket and substantially centered lengthwise of same, said cathedral having a substantially centered vertical slit of a length approximately equal to one-half to three-fourths the depth of the ridge center partition side of said pocket and generally vertically centered on same, the upper end of said vertical slit having substantially centered thereon a deeply downturned cross slit while the lower end of said vertical slit has substantially centered thereon a deeply upturned cross slit, and a cross slit substantially midlength of said vertical slit, the ends of said cross slit being approximately centered between the corresponding ends of said deeply downturned and deeply upturned cross slits, and wherein the vertical length of said cathedral is approximately two-thirds the depth of the ridge center partition side of said pocket and said deeply downturned and deeply upturned cross slits are substantially arcuate, and further wherein said offsetting is substantially in a vertical direction.

12. An egg carton having spaced wall members, bottom members, an inverted V-shaped ridge center partition open from the bottom to the top thereof and forming a longitudinal partition connecting together said bottom members with the bottom of said carton being elevated in its longitudinal partition edge joining portion, transverse partitions cooperating with said longitudinal partition to separate the interior of the egg carton into a multiplicity of egg receiving pockets, and a cover member normally closing said egg carton, wherein said transverse partitions which are at the opposite ends of said egg carton extend substantially to the plane of the bottom of said egg carton and have an upwardly extending deep notch in the bottom center portion of same, said inverted V-shaped ridge center partitions having a notch in its top to receive and fit the deep notched bottom portion of said transverse partition, said bottom panels of said carton and the lower portion of the adjacent side of said inverted V-shaped ridge center partition being slotted to permit the bottom portion of said transverse partition to extend therethrough, an inwardly and upwardly extending outer end alined pair of hooks in the opposite sides of said deep notch of said transverse partitions which extend substantially to the bottom of said carton, said hooks engaging the end of said carton bottom slot which terminates in the lower portion of said inverted V-shaped ridge center partition, to hold said transverse end partitions firmly in place, said egg carton also including an egg cushioning cathedral for each of said egg receiving pockets, said cathedral being wholly located in said ridge center partition side of said pocket and substantially centered lengthwise of same, said cathedral having a substantially central vertical slit of a length approximately equal to one-half to three-fourths the depth of the ridge center partition side of said pocket and generally vertically centered on same, the upper end of said vertical slit having substantially centered thereon a deeply downturned cross slit while the lower end of said vertical slit has substantially centered thereon a deeply upturned cross slit, and a cross slit substantially midlength of said vertical slit, the ends of said cross slit being approximately centered between the corresponding ends of said deeply downturned and deeply upturned cross slits, and wherein said egg carton has supporting feet, one for each egg receiving pocket, said supporting feet being cut from said carton bottom members and extending below each said cathedral and in the plane of same, and forming extensions of the sides of said inverted V-shaped ridge center partition with each such extension being approximately as wide as said cathedral and terminating substantially in a plane including the junction of said wall members and bottom members, and further wherein said supporting feet on opposite sides of said inverted V-shaped ridge are offset sidewise from each other approximately in the range of one-sixteenth to three-sixteenths of an inch.

References Cited

UNITED STATES PATENTS

| | | | | |
|---|---|---|---|---|
| 2,873,059 | 2/1959 | Reifers | | 229—28 |
| 2,946,497 | 7/1960 | Randles | | 229—28 |
| 3,006,528 | 10/1961 | Reifers | | 229—28 |
| 3,141,391 | 7/1964 | Coleman | | 93—37 |
| 3,185,380 | 5/1965 | Reifers et al. | | 229—28 |
| 3,219,254 | 11/1965 | Hall et al. | | 229—29 |
| 3,246,827 | 4/1966 | Walter | | 229—28 |
| 3,251,531 | 5/1966 | Hook et al. | | 229—28 |

JOSEPH R. LECLAIR, *Primary Examiner.*

DAVIS T. MOORHEAD, *Examiner.*

UNITED STATES PATENT OFFICE
CERTIFICATE OF CORRECTION

Patent No. 3,351,262                      November 7, 1967

Charles E. Hook et al.

It is hereby certified that error appears in the above numbered patent requiring correction and that the said Letters Patent should read as corrected below.

Column 3, line 34, after "each" insert -- end --; column 8, line 33, after "same" insert a comma; column 9, line 61, after "said" insert -- egg --; line 67, for "inverter" read -- inverted --; column 10, line 6, for "centered" read -- central --; column 11, line 7, for "Randles" read -- Randles, Jr. --.

Signed and sealed this 26th day of November 1968.

(SEAL)
Attest:

Edward M. Fletcher, Jr.                      EDWARD J. BRENNER

Attesting Officer                              Commissioner of Patents